(12) United States Patent
Schmatloch et al.

(10) Patent No.: US 7,691,479 B2
(45) Date of Patent: Apr. 6, 2010

(54) UNIVERSAL PRIMER COMPOSITIONS AND METHODS

(75) Inventors: Stefan Schmatloch, Thalwil (CH); Dirk Schwöeppe, Freienbach (CH)

(73) Assignee: Dow Global Technologies Inc., Midland, MI (US)

( * ) Notice: Subject to any disclaimer, the term of this patent is extended or adjusted under 35 U.S.C. 154(b) by 7 days.

(21) Appl. No.: 12/041,915

(22) Filed: Mar. 4, 2008

(65) Prior Publication Data

US 2008/0268259 A1 Oct. 30, 2008

(51) Int. Cl.
*B32B 27/40* (2006.01)
(52) U.S. Cl. .............. 428/423.1; 428/422.8; 428/423.3; 528/28; 528/44; 528/45; 528/67; 528/85; 524/589; 156/331.7
(58) Field of Classification Search .................... 528/28, 528/44, 45, 67, 85; 428/423.1, 423.3, 422.8; 524/589; 156/331.7
See application file for complete search history.

(56) References Cited

U.S. PATENT DOCUMENTS

| | | | |
|---|---|---|---|
| 4,374,237 A | 2/1983 | Berger et al. | |
| 4,687,533 A | 8/1987 | Rizk et al. | |
| 4,792,316 A | 12/1988 | Skedeleski et al. | |
| 4,910,279 A | 3/1990 | Gillis et al. | |
| 5,603,798 A | 2/1997 | Bhat | |
| 6,008,305 A * | 12/1999 | Wang et al. | 525/440.03 |
| 6,974,500 B2 | 12/2005 | Miyata et al. | |
| 7,087,127 B2 | 8/2006 | Mahdi et al. | |
| 2003/0084995 A1 | 5/2003 | Zhang | |
| 2006/0287408 A1 | 12/2006 | Baikerikar et al. | |

FOREIGN PATENT DOCUMENTS

| | | |
|---|---|---|
| EP | 0592138 A1 | 4/1994 |
| EP | 1382625 A1 | 1/2004 |
| WO | 00/00530 A1 | 1/2000 |
| WO | 2006/042305 A1 | 4/2006 |

OTHER PUBLICATIONS

Vitel 2200B MSDS.*
Copending U.S. Appl. No. 12/033,420 (U.S. Appl. No. 60/913,700), filed Apr. 24, 2007.
Copending U.S. Appl. No. 12/035,770 (U.S. Appl. No. 60/949,369), filed Dec. 18, 2007.
Copending U.S. Appl. No. 11/959,208 (U.S. Appl. No. 60/870,639), filed Dec. 18, 2007.
Copending U.S. Appl. No. 11/958,983 (U.S. Appl. No. 60/870,643), filed Dec. 18, 2007.
Copending U.S. Appl. No. 11/959,107 (U.S. Appl. No. 60/870,641), filed Dec. 18, 2007.
Copending U.S. Appl. No. 12/033,447 (U.S. Appl. No. 60/913,706), filed Feb. 19, 2008.
Copending U.S. Appl. No. 61/014,547, filed Dec. 18, 2007, by Baikerikar et al., "Protective Coating for Window Glass Having Enhance Adhesion to Glass Bonding Adhesives."
Copending U.S. Appl. No. 11/472,119, filed Jun. 20, 2006 (priority to U.S. Appl. No. 60/692,318, filed Jun. 20, 2005), published as 2006-0287408.
International search report, International application No. PCT/US2008/054509, mailed Jul. 8, 2008.
Kohler, Journal of American Chemical Society, vol. 49, p. 3181.

* cited by examiner

*Primary Examiner*—Randy Gulakowski
*Assistant Examiner*—Olatunde S Ojurongbe
(74) *Attorney, Agent, or Firm*—Dobrusin & Thennisch PC

(57) ABSTRACT

A composition for and method for bonding a substrate. In general, applied to a substrate will be a primer composition that includes an adhesion promoter, which is an adduct prepared by the reaction of at least one aromatic polyisocyanate compound, with an active hydrogen containing moiety of an organofunctional silane, and a prepolymer derived from the reaction of at least one aliphatic polyisocyanate and a polyol, and is at least partially reacted with an active hydrogen containing moiety of an organofunctional silane.

18 Claims, No Drawings

UNIVERSAL PRIMER COMPOSITIONS AND METHODS

CLAIM OF PRIORITY

The present application claims the benefit of the filing date of Provisional Application No. 60/913,703 (filed Apr. 24, 2007) and International PCT Application No. PCT/US08/54509 (filed Feb. 21, 2008), the contents of which are hereby incorporated by reference in their entirety.

FIELD OF THE INVENTION

This invention relates to bonding of substrates and more specifically to bonding of substrates in automotive vehicle applications, such as one or more of substantially transparent substrates, cured polyurethane adhesives, encapsulated panels, electrostatically coated substrates, painted substrates, or the like.

BACKGROUND OF THE INVENTION

When properly prepared, glass substrates are installed into an opening in an automotive vehicle structure by applying one or more layers of primer to the glass substrate, over the layer of fired ceramic enamel, applying an adhesive between the primer and the vehicle structure and locating the glass substrate within the opening.

Notwithstanding the commercial availability of excellent primers having widespread applicability (e.g., Betaprime™ 5500 and 5404, available from the Dow Chemical Company), there remains a desire to expand the suitability of such primers for additional applications.

Examples of efforts to improve primer composition performance are illustrated in EP 1382625A1; WO 2006/042305 A1; and U.S. Pat. No. 6,976,500, all incorporated by reference.

SUMMARY OF THE INVENTION

The invention satisfies such desire by providing a composition for and method for bonding. In general, applied to substrate will be a primer composition that includes a reaction product of 1) a primer composition (and more specifically a one-step primer) including a prepolymer with a free isocyanate content, which is at least partially reacted with the active hydrogen of an organofunctional silane from an amino-silane with a secondary or primary amino group, a mercapto-silane, or a combination thereof 2) an adhesion promoter prepared by the reaction of a) at least one aromatic poly-isocyanate with the active hydrogen of an organofunctional silane selected from an amino-silane with a secondary or primary amino group, a mercapto-silane, or a combination thereof; and 3) optionally, an isocyanate functional prepolymer with an isocyanate content greater than about 1%, and being the reaction product of a polyol and an aromatic polyisocyanate. In a more particular aspect, a) the aromatic poly-isocyanate of the adhesion promoter compound includes a thiophosphate, a phosphate, a thiophosphane moiety or any combination thereof (e.g., most particular a tris(p-isocyanato-phenyl)-thiophosphate; b) the amino functional silane of the primer composition and the adhesion promoter includes at least one silicon atom, at two or three methoxy and/or ethoxy groups, bound to at least one of the silicon atoms, a hindered secondary amino group or any combination thereof; or c) a combination of a) and b); and/or the isocyanate functional prepolymer with an isocyanate content greater than about 1% is the reaction product of a polyol having a functionality of greater than about 2 and a molecular weight ($M_n$) greater than about 300 and an aromatic polyisocyanate.

Another aspect of the invention relates to an additive that could be incorporated into a base primer composition that includes a polymeric prepolymer with a free isocyanate content, and more specifically, at least one prepolymer (derived from the reaction of at least one aliphatic polyisocyanate and a polyol), which is at least partially reacted with an amino group of an aminosilane, wherein the aminosilane includes a plurality of alkoxy groups bound to silicon. When employed, the additive enhances the ability of a primer to which it is added to bond to a variety of substrates, and particularly improves adhesion to metal surfaces, glass surfaces, polymeric surfaces, any coating thereon or otherwise.

More particularly, As addressed herein, the invention pertains to a method for bonding a first substrate to a second substrate, including the steps of (a) applying to one or both of the substrates (i) a primer composition that includes an adhesion promoter, which is an adduct prepared by the reaction of at least one aromatic polyisocyanate compound (e.g., a trifunctional isocyanate), with an active hydrogen of an organofunctional silane; (ii) a prepolymer that is derived from the reaction of at least one aliphatic polyisocyanate and a polyol, and is at least partially reacted with the active hydrogen of an organofunctional silane; and optionally (iii) a solvent; (b) applying an adhesive to at least one of the substrates and (c) assembling the two substrates.

In general, as will be described, the aromatic polyisocyanate compound will include a thiophosphate, a phosphate, a thiophosphane moiety, or any combination thereof. For example, the aromatic polyisocyanate may include tris(isocyanatophenyl)thiophosphate.

One particular composition may further include at least one isocyanate functional prepolymer with an isocyanate content greater than about 1%. Generally, such prepolymer will be the reaction product of a polyol having a functionality of greater than about 2 and a molecular weight ($M_n$) greater than about 300 and an aromatic polyisocyanate. For example, it may be a reaction product of a triol and a diisocyanate that includes MDI.

In a particular respect, one or more of the organofunctional silanes may include two or three methoxy and/or ethoxy groups bound to each of at least one silicon atom. It may include a mercapto group, an amino group (e.g., a secondary amino group), or a combination thereof.

The compositions herein may further include diethylmalonate, an acid (e.g., phosphoric acid), a film forming resin, a pigment or a catalyst or a combination thereof.

Generally the adhesion promoter is present in a weight ratio of about 1:100 to about 2:1 (and more specifically about 2:35 to about 7:25) parts adhesion promoter to aliphatic isocyanate prepolymer. When employed, the isocyanate functional prepolymer with an isocyanate content greater than about 1% is present in a weight ratio of about 1:140 to about 1:1 (and more specifically about 2:55 to about 7:45) parts of adhesion promoter to the isocyanate functional prepolymer. Solvent may be present in an amount of about 40 to about 80%, preferably about 50 to about 70%, by weight. If employed, diethylmalonate may be present in an amount of about 0.1 to about 0.5% by weight; acid may be present in an amount of about 0.01 to about 0.05% by weight, or both.

The invention also contemplates assemblies prepared according to the above described steps. Any of a number of substrates may be employed, such as glass, enamel, cured polyurethane, glass encapsulation materials, e-coat, galvanic zinc coats, aluminum, steels, paint, plastics and hard coated organic glazing. The invention also contemplates kits that include the primer described herein and at least one adhesive.

DETAILED DESCRIPTION

Unless otherwise set forth (e.g., as a weight ratio), as used herein, all parts by weight are based on 100 parts by weight of the recited composition. In a case of the resulting composition, this means the weights are based on 100 parts by weight of the overall resulting composition. It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1.

In general, the compositions herein are predicated upon the combination of an adhesion promoter with a base primer that includes at least one prepolymer derived from the reaction of at least one polyisocyanate and at least one polyol, and particularly one that will have a free isocyanate content. In a more particular aspect, the base primer includes an isocyanate functional prepolymer derived from the reaction of an aliphatic polyisocyanate and a polyol. In one highly specific embodiment, the base primer includes an isocyanate functional prepolymer derived from the reaction of an aliphatic polyisocyanate and a polyol, and is at least partially reacted with an amino group of a silane, and particularly an aminosilane (e.g., a secondary aminosilane), wherein the aminosilane includes a plurality of alkoxy groups bound to one or more silicon atoms (e.g., two or three methoxy groups bound to silicon, two or three ethoxy groups bound to silicon, a combination thereof or the like). Examples of commercially available primers that may be employed in accordance with the present teaching include, without limitation, Betaprime™ 5500 or Betaprime™ 5404, available commercially from The Dow Chemical Company.

Without intending to be bound by theory, it is believed that the compositions herein make advantageous employment of a particular molecular structure by which at least a portion of the molecule includes silicon (e.g., it is silanated), and a portion of the molecule includes a functionality, such as an isocyanate functionality, which is capable of linking with a base primer such as through the molecular network of the base primer.

In one specific aspect, the invention contemplates the employment of a composition that includes a prepolymer that is derived from the reaction of at least one aliphatic polyisocyanate and a polyol, and is at least partially reacted with the active hydrogen of an organofunctional silane. The prepolymer may be part of a base primer composition.

It is not necessary that any such base primer composition include such a polymer. Rather, it is contemplated more generally, that the compositions herein include a reaction product of an isocyanate, and an isocyanate-reactive compound.

The isocyanates useful herein may be selected from diisocyanates, tri-isocyanates or any combination thereof. Suitable isocyanates may include an aliphatic, cycloaliphatic, araliphatic, heterocyclic, aromatic isocyanate, or any combination thereof. Particular examples may include an isocyanate selected from hexamethylene diisocyanate (HDI), isophorone diisocyanate (IPDI), methylene diphenyl 4,4'-diisocyanate (MDI) or any combination thereof, and still more particularly one selected from isophorone diisocyanate (IPDI), methylene diphenyl 4,4'-diisocyanate (MDI), toluene diisocyanate (TDI), or any combination thereof. As noted, polymeric derivatives of any of the isocyanates herein are also contemplated.

The isocyanates may typically have a percent NCO amount of up to about 25%, more specifically up to about 15%, and still more specifically up to about 10%. For example the percent NCO may range from about 1 to about 10%, and more specifically about 3 to about 8%. Preferably the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionality may also be used, but may cause excessive cross-linking, and can cause the cured primer to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200.

Exemplary isocyanate-reactive compounds may be an organic compound having at least two isocyanate-reactive moieties, such as a compound containing an active hydrogen moiety, or an iminofunctional compound. For the purposes of this invention, an "active hydrogen" containing moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety.

Suitable polyols may include, for example, polyether polyols, polyester polyols, poly(alkylene carbonate)polyols, hydroxyl-containing polythioethers, polymer polyols, and mixtures thereof. Polyether polyols may include, for example, one or more diols, triol or tetrols based upon polyoxyethylene, polyoxypropylene, polyoxybutylene, and/or polytetramethylene ether. In general, polyether polyols are prepared by polymerizing alkylene oxides in the presence of an active hydrogen-containing initiator compound. Most preferred, however, are alkylene-oxide-capped polyols.

Preferably, the isocyanate-reactive compound has a functionality of at least about 2.0, more preferably at least about 3.0, and is preferably no greater than about 5.0, more preferably no greater than about 4.5, and is most preferably no greater than about 4.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500. One particular example employs a polyol isocyanate reactive compound that has an equivalent weight of from about 100 to about 1500, and more specifically about 300 to about 1000.

The isocyanate and isocyanate reactive compound may be reacted in the presence of a suitable catalyst. Catalysts for use herein may include, for example, a metal complex such as a stannous or stannic compound. Examples include a stannous salt of a carboxylic acid (e.g., stannous octoate, stannous oleate, stannous acetate, and stannous laurate), a trialkyltin oxide, a dialkyltin dicarboxylate (e.g., dibutyltin dilaurate, dibutyltin diacetate, diethyltin diacetate, and dihexyltin diacetate), a dialkyltin dihalide, or a dialkyltin oxide, such as di-2-ethylhexyltin oxide or dioctyltin dioxide, a tertiary amine, or a tin mercaptide. Other catalysts may also be used. For example, tertiary amine catalysts include trialkylamines (e.g., trimethylamine, triethylamine), heterocyclic amines, such as N-alkylmorpholines (e.g. N-methylmorpholine, N-ethylmorpholine, dimethyldiaminodiethyl ethyl, etc.), 1,4-dimethylpiperazine, triethylenediamine, etc. Aliphatic polyamines, such as N,N,N',N'-tetramethyl-1,3-butanediamine may also be used as catalysts. One highly preferred catalyst includes a dibutyltin compound, and more specifically, it includes or consists essentially of dibutyltin dilaurate.

The isocyanate and isocyanate reactive compound may be reacted also in the presence of a suitable silane (e.g., an aminosilane) for introducing silicon into the base primer.

The compositions herein may include one or more other ingredients, such as a solvent, a stabilizer, a film former, a colorant (e.g., carbon black, e.g., Raven 420), a filler, an ultraviolet protectant, or any combination thereof.

By way of example, the solvent component of the primer composition generally is volatile and is preferably a solvent that will dissolve and/or disperse the components at a temperature in the range of from about −10° C. to about 100° C., more preferably from about 0° C. to about 40° C. The solvent is preferably anhydrous in order to help prevent the isocyanate from prematurely reacting with water. Examples of such solvents include xylene, ethylbenzene, toluene, ethylacetate, propyl acetate, butyl acetate, butanol, propanol, isopropanol, ethanol, butoxyl, 2-butoxyethanol, 3-methoxybutylacetate, NMP, n-heptane, petroleum, butyl acetate, acetone, and methyl ethyl ketone, or any combination thereof, and is preferably butoxyl, methyl ethyl ketone or a mixture thereof. The solvent will comprise the balance any of the resulting or intermediate compositions and is preferably used in an amount of at least about 50%, more preferably at least about 55%, and most preferably at least about 60%; and is preferably no greater than about 90%, more preferably no greater than about 85%, and most preferably no greater than about 80%, based on the weight of the total primer composition.

The compositions herein may include one or more film forming resins, which contain one or more moieties able to polymerize, curing to form a continuous coating and which is resistant to many environmental forces. In a preferred embodiment, preferably the film-forming resin polymerizes when exposed to free radicals or to cationic reaction conditions. In one specific aspect, the film-forming resin is a resin curable by exposure to irradiation, such as UV radiation or an electron beam. The film-forming resin may contain functional groups which polymerize when exposed to free radicals, such as vinyl, acrylate, styrenic, diene, methacrylate, allyl, thiolene, vinyl ether, unsaturated ester, imide, N-vinyl, acrylamide containing moieties, mixtures thereof or the like. In a more preferred embodiment, the functional groups on the film-forming resin are acrylic and/or methacrylic moieties. In many embodiments, the film-forming resin is an oligomer or prepolymer having the described functional moieties. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters or mixtures thereof. One specific class of oligomers and prepolymers includes aliphatic urethane acrylates.

One example of a suitable commercially available film former is Paraloid® B48N, available from The Rohm and Haas Company.

The film-forming resin may be present in any suitable amount. For example, it may be present in an amount of about 0.1 parts by weight, about 1 part by weight, about 5 parts by weight, or even about 10 parts by weight or greater, based on the weight of the primer composition. Preferably, the film-forming resin is present in the composition in an amount of about 70 parts by weight or less based on the weight of the primer composition and more preferably about 60 parts by weight or less, more preferably about 50 parts by weight or less and most preferably 40 parts by weight or less of the primer composition.

The compositions herein may optionally include one or more other ingredients, such as one or more stabilizers to help protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate, alkylphenol alkylates, paratoluene sulfonic isocyanates, benzoyl chloride, orthoalkyl formats or any combination thereof. Such stabilizers are preferably used in an amount of about 0.1 parts by weight or greater based on the total weight of the intermediate or resulting composition, preferably about 0.5 parts by weight or greater and more preferably about 0.8 parts by weight or greater. Such stabilizers are used in an amount of about 5.0 parts by weight or less based on the weight of the intermediate or resulting composition, more preferably about 2.0 parts by weight or less and most preferably about 1.4 parts by weight or less of the intermediate or resulting composition. For example, one option is to employ diethylmalonate in an amount up to about 2 parts by weight, and more specifically about 0.1 to about 1 part by weight (e.g., about 0.1 to about 0.3 parts by weight). It is also possible to optionally employ a suitable acid, such as phosphoric acid, e.g., in an amount up to about 0.2 parts by weight, and more specifically up to about 0.1 parts by weight (e.g., about 0.01 to about 0.05 parts by weight).

As indicated, the present invention makes particular use of an adhesion promoter that generally is a reaction product of an organofunctional silane and an isocyanate. More specifically, as will be addressed, the adhesion promoter includes at least one aromatic poly-isocyanate, which more particularly includes phosphorus.

In one embodiment, one ingredient of the adhesion promoter may include an amino-silane, and more particularly a secondary amino-silane. One attractive silane includes at least two silyl groups, with three methoxy groups bond to each of the silanes a hindered secondary amino group or any combination thereof. An example of one such commercially available amino-silane is bis-(trimethoxysilylpropyl)-amine, such as Silquest A-1170, from GE Advanced Materials-Silicones. Additional information about suitable silane materials for use as an adhesion promoter is found in U.S. Pat. No. 4,374,237, hereby incorporated by reference. Other examples of silanes include, without limitation, (alone or in combination with bis-(trimethoxysilylpropyl)-amine, include silanes having a hydroxy functionality, a mercapto functionality, or both, such as 3-aminopropyltrimethoxysilane, 3-aminopropyltriethoxysilane, 3-aminopropyltrismethoxy-ethoxyethoxysilane, 3-aminopropyl-methyl-diethoxysilane, N-methyl-3-aminopropyltrimethoxysilane, N-butyl-3-aminopropyltrimethoxysilane, 3-mercaptopropyltrimethoxysilane, 3-mercaptopropyltriethoxysilane, 3-mercaptopropyl-methyl-dimethoxysilane, (N-cyclohexylaminomethy)methyldi-ethoxysilane, (N-cyclohexylaminomethyl)triethoxysilane, (N-phenylaminomethyl)methyldimethoxysilane, (N-phenylaminomethyl)trimethoxysilane, N-ethyl-aminoisobutyltrimethoxysilane, 4-amino3,3-dimethylbutyltrimethoxysilane, or any combination thereof.

The adhesion promoter also includes as one of its ingredients an aromatic isocyanate, and particularly a trifunctional isocyanate. In a particular preferred embodiment the adhesion promoter includes at least one isocyanate including phosphorus. An example of one such isocyanate is described generally in U.S. Pat. No. 6,974,500; incorporated by reference, and is represented by the following Formula 1:

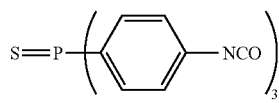

Formula 1

One possible isocyanate is tris(p-isocyanato)thiophosphane. A particularly preferred isocyanate is a thiophosphate with a isocyanate group such as a solution of tris(p-isocyanato-phenyl)-thiophosphate in ethyl acetate sold under the tradename DESMODUR RFE and commercially available from Bayer Corporation, Pittsburgh, Pa. Other examples of possible isocyanates (which may be employed alone or in combination with tris(p-isocyanato-phenyl)-thiophosphate include trifunctional isocyanates, which may be aromatic or aliphatic (e.g., an aliphatic polyisocyanate based upon HDI, and possibly having an isocyanate content of about 15 to about 25%). Examples of suitable trifunctional isocyanates include those commercially available under the designations Desmodur N 100, Desmodur N 3300, or Tolonate HDT.

In general, the adhesion promoter is prepared by admixing silane with the isocyanate, particularly in an amount of about 1 mole isocyanate with about 1 to about 3 moles silane (e.g., amino-silane, mercapto silane, or combination thereof), and more specifically about one mole isocyanate with about 2.3 moles silane (e.g., amino-silane, mercapto silane, or combination thereof).

One particular approach to making the adhesion promoter is to at least partially react an aromatic polyisocyanate having a functionality greater than about 2 with a silane (e.g., aminosilane (such as a secondary amino functional silane), mercapto silane, or combination thereof) wherein the silane includes a plurality of alkoxy groups bound to silicon (e.g., two or three methoxy groups bound to silicon, two or three ethoxy groups bound to silicon, a combination thereof or the like).

The isocyanate functional prepolymer with an isocyanate content greater than about 1% generally is the reaction product of a polyol having a functionality of greater than about 2 and a molecular weight ($M_n$) greater than about 300 and an isocyanate, and more specifically an aromatic polyisocyanate. The second prepolymer herein generally will be an isocyanate prepolymer and particularly a reaction product of an isocyanate and a polyol. In one specific aspect, the preferred isocyanate will be a diisocyanate, such as one having a functionality of at least about 2 (e.g., a trifunctional) diisocyanate. For example, the diisocyanate may be an aromatic diisocyanate, such as one selected from TDI, MDI or a combination thereof. A specific preferred diisocyanate is includes MDI or a prepolymer thereof, such as one that includes approximately 97% 4,4'-diphenyl-methane diisocyanate and 3% 2,4'-diphenylmethane diisocyanate. A commercially available example of one such isocyanate is Isonate® M125 MDI, available through The Dow Chemical Company. Though other polyols may be selected, a particular preferred one will be a triol, and particularly one having a hydroxyl number of at least about 200. An example of one such polyol is available from the Dow Chemical Company, under the designation VORANOL™ CP260.

Typically, the adhesion promoter will be employed in an amount of about 0.5 to about 20% by weight of the total composition, more specifically about 1 to about 10% by weight, and still more specifically about 2 to about 7% by weight. The skilled artisan will appreciate, particularly with respect to amounts of adhesion promoters employed herein, that higher or lower amounts may be employed. For example, an adhesion promoter that does not employ any solvent may be employed in a lesser amount than an adhesion promoter that does employ a solvent.

The base primer, in turn, typically will be employed in an amount of about 30 to about 90% by weight of the total composition, more specifically about 40 to about 80% by weight, and still more specifically about 55 to about 65% by weight.

The isocyanate functional prepolymer with an isocyanate content greater than about 1% in turn, typically will be employed in an amount of about 10 to about 60% by weight of the total composition, more specifically about 20 to about 50% by weight, and still more specifically about 30 to about 40% by weight.

Generally the adhesion promoter is present in a weight ratio of about 1:100 to about 2:1 (and more specifically about 2:35 to about 7:25) parts adhesion promoter to aliphatic isocyanate prepolymer. When employed, the isocyanate functional prepolymer with an isocyanate content greater than about 1% is present in a weight ratio of about 1:140 to about 1:1 (and more specifically about 2:55 to about 7:45) parts of adhesion promoter to the isocyanate functional prepolymer.

One particular preferred composition includes the base primer, the adhesion promoter, the isocyanate functional prepolymer with an isocyanate content greater than about 1%, a stabilizer and an acid. More specifically, the stabilizer will include diethyl malonate, the acid will include phosphoric acid, or both. For example, the base primer may be present in an amount of about 50 to about 65% by weight and more specifically about 55 to about 60% by weight (e.g., about 57.9% by weight). The adhesion promoter will be present in an amount of about 2 to about 7% by weight, and more specifically about 4 to about 6% by weight (e.g., about 5.2% by weight). The isocyanate functional prepolymer with an isocyanate content greater than about 1% will be present in an amount of about 30 to about 40% by weight, and more specifically about 33 to about 38% by weight (e.g., about 36.6% by weight). The composition may also include about 0.1 to about 0.5% by weight diethylmalonate (e.g., about 0.25%) and about 0.01 to about 0.05% by weight phosphoric acid (e.g., about 0.03% by weight).

The primer compositions herein may be employed in any of a number of applications. One particular approach is to apply the primer composition (e.g., as a one part composition), using art-disclosed techniques, to a substrate for use in an automotive vehicle windshield, backlight, side window, sun/moon roof, architectural window, skylight, porthole, door opening, display case, a lens or otherwise. Another useful application is for printing If labels, packages, containers (e.g., beverage bottles), or otherwise. A preferred application is the use of the primer compositions herein to make substantially transparent panel assemblies. The assemblies herein may be adapted for temporary or permanent mounting to a structure. The assemblies may be adapted for opening, closing, or otherwise translating, e.g., by sliding, by articulating, by pivoting, by folding, or any combination thereof. The assemblies thus may be employed in one or more applications such as automotive vehicle backlights, side windows, sun/moon roofs, architectural windows, skylights, portholes, door openings, display cases, or otherwise. The compositions and methods herein are also particularly useful when employed in combination with pre-applied adhesive systems, onto an electrostatically primed (i.e., an e-coated) substrate, a painted substrate or any combination thereof.

Typically, the substrates will be substantially flat or shaped, e.g., for defining a curved surface. The substrates will generally be panels that are transparent through at least one surface, and particularly through both opposing surfaces, over at least about 25% of the area of the surface, and more specifically, at least a majority (e.g., at least about 60%, 75% or even 90% of the area of the surface). The substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls (e.g., polyvinyl chlorides), polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Substrates may have a laminated layer, a tint or any combination thereof. Substrates may also be a reaction injection molded plastic. Assemblies that include reaction injection molded parts encapsulating a panel, such as a substantially transparent panel, may be bonded according to the teachings herein. An example of one possible approach to the manufacture of encapsulated panels is disclosed in U.S. Patent Application Ser. No. 60/870,643 (entitled: "ENCAPSULATED PANEL ASSEMBLIES AND METHODS FOR MAKING SAME"; incorporated by reference). The compositions herein may also be employed for bonding a surface of a pinchweld assembly.

Though some applications may call for the coating of substantially an entire surface of a substrate with the composition herein, ordinarily the compositions will be applied to the substrates selectively, according to a predetermined pattern (e.g., substantially along an edge portion of the substrate, about the periphery of the substrate, or otherwise). For example, one approach is to apply the composition from the edge of the substrate inwards toward the central portion in a width of about 2, 5, 8, or even 12 cm or greater. It is also possible that the composition will may be applied for defining one or more lines, curves, dots, or other geometric configurations comprising segments of constant or varying width height, length or other dimension.

Any of a variety of art-disclosed patterns may be applied. The primer composition may be applied to a substrate (e.g., glass or coated plastic) using any art-disclosed means, such as using a brush, roller, sprayed onto the surface, ink jet printing, screen printing and the like. It may be applied using art-disclosed robotic application devices (e.g., one having at least 2 axes of motion). After application of the composition to the surface of the substrate, it is exposed to polymerization conditions.

The substrates herein typically will include at least one surface onto which the composition is applied. The surface may optionally be treated for improving the bond strength of the composition to the substrate, e.g. by a primer, a flame spray, a corona treatment, a plasma treatment, or some other surface treatment. However, in one specific example, the outer surface is substantially free of any surface treatment. Accordingly, upon application, the composition is in direct intimate contact with the substrate, and particularly in the substantial absence any intermediate interface layer. Of course, after applying the composition to the substrate it is also possible to apply over some or all of one or both of the composition and substrate a further layer (e.g., a silicone, an acrylic, a polyurethane, or otherwise, for realizing a protective over-layer). It is also possible that the composition herein may be employed over, beneath and/or adjacent an inorganic or an organic frit (e.g., a frit of the type taught in co-pending application Ser. No. 11/472,119 filed Jun. 20, 2006 (priority to 60/692,318 filed Jun. 20, 2005)), by Baikerikar et al. (incorporated by reference).

When applied, the composition herein generally will have a thickness of up to about 250 microns or higher. More commonly it will be less than about 150 microns, less than about 100 microns or even less than about 50 microns (e.g., about 10 to about 30 microns or smaller).

Examples of suitable adhesives or sealants for use in combination with the primer compositions of the present invention include, without limitation, one-part or two-part urethane compositions, which in turn may be moisture curable. Particularly preferred urethanes are based upon MDI, HMDI, or a combination thereof. Examples of commercially available adhesives include, without limitation, those available from The Dow Chemical Company under the designation BETASEAL™ such as one or more of grade Nos. 1759, 1841, 1843, 1965, 2002, or 2002 LVRP.

The invention also contemplates kits that include an adhesive or sealant composition and one or more primer compositions. For example, such a kit might include one or more primer compositions in accordance with the present invention, with or without the adhesive or sealant composition (e.g., a one-part urethane or a two-part urethane adhesive). It may also include one or more cleaners, applicators, tapes, tools or any combination thereof. The compositions herein may be provided in a cartridge, a foil pack or both.

The compositions herein provide a generally hard and abrasion resistant coating. It is also expected that the compositions will exhibit excellent adhesion performance and weatherability. The resulting primer materials freshly prepared according to the teachings herein also is expected to have good storage stability.

Resulting compositions have i) a solids content in the range of about 30 to about 50%, and more specifically about 37 to about 43% (e.g., about 40.4%) (measured per ISO 3251); ii) an isocyanate content of about 1 to about 7%, and more specifically about 3.0 to about 3.6% (e.g, about 3.26%)(measured per ISO 11909); iii) a density of about 0.92 to about 0.95 and more specifically about 0.934 to about 0.944 g/cm$^3$ (e.g., about 0.939 g/cm$^3$) (measured per ISO 2811); iv) a silane content (e.g., trimethoxysilane) of about 1 to about 5%, more specifically about 2.4 to about 3.0% (and even more specifically, when employing a trimethoxysilane group, it will be present in an amount of about 2.71%) (measured per ASTM D6843-02, ASTM D6844-02 or both); or v) any combination of i) through iv).

The resulting samples demonstrate 100% cohesive failure after aging 7 days at room temperature; more preferably, also after aging an additional 7 days subject to water immersion; still more preferably, also after aging an additional 7 days at 90° C.; yet still more preferably, also after 7 additional days cataplasma cycling. It is also possible that compositions herein will demonstrate 100% cohesive failure after still yet after 14 additional days cataplasma cycling.

In general, for the cataplasma cycling, the samples are stored directly in a climatic chamber at 70° C., 100% relative humidity, for 7 days, or wrapped in cotton wool, humidified with sufficient water and sealed in a polyethylene bag to be held thereafter in an oven at 70° C. for 7 days. Next, the samples are placed in a freezer for 16 hours at −20° C., after which the sample is allowed to stand at room temperature for 2 hours. The cycle is repeated multiple times, after which the samples are removed from the bag and subjected to the quick knife adhesion test. Desirably, there is no blistering of the primer layer and failure is cohesive in the sealant layer.

The following examples illustrate the teachings herein. Similar results are believed possible for compositions wherein the amounts of the ingredients varies by within about 10 or even about 25% of the recited amounts. The examples thus also teach a range of concentrations that would fall within such variation.

Examples

An example primer composition is prepared by reacting: a) about 57.9 weight % Betaprime™ 5500; b) about 36.6 weight % of the reaction product of VORANOL™ CP260 and an aromatic diisocyanate (e.g., Isonate® M125 MDI); c) about 5.2 weight % of the reaction product of Demodur® RFE and Silquest® A1170; about 0.25 weight % diethylmalonate; and about 0.03 weight % phosphoric acid.

Various commercial windshields are provided from different vendors, with ceramic frit applied thereto. Betaclean™ 3300 (available from The Dow Chemical Company) is applied to clean the windshields, and allowed to flash off for about 2 minutes at about 23° C. and about 50% relative humidity. The example primer composition is applied and after an open time of about 15 minutes, a bead of adhesive (Betaseal™ 1965 (available from The Dow Chemical Company)) is applied and the samples prepared for peel testing as described herein. After seven days of aging at room temperature the samples are expected to exhibit at least 75% cohesive failure, and more specifically at least 100% cohesive failure for each. At least a majority of samples are also expected to be able to withstand with 100% cohesive failure an additional 7 day cataplasma cycling.

The example primer composition is analyzed for peel strength in samples using a reaction injection molding polyurethane substrate as might be found in an encapsulated window assembly. For sake of comparison, the adhesion promoter herein is admixed with commercially available primers (denoted as primer 1 and primer 2) from different vendors, and is employed with commercially available sealants (denoted as adhesive 1, adhesive 2, and adhesive 3). Substrates are first cleaned with Betaclean™ 3900. Primer is applied and flashed off for 15 minutes at 23° C. and 50% relative humidity, before applying the sealant. The samples are then tested. The samples are expected to exhibit the results of the following Table. BM 7120 refers to Betamate™ 7120, available from The Dow Chemical Company, BM 2700 refers to Betamate™ 2700, available from The Dow Chemical Company, BS X 1502 refers to Betaseal™ X1502, available from The Dow Chemical Company BP 5504 refers to Betaprime™ 5504 modified in accordance with the teachings herein. It is expected that the Betaprime™ 5504 modified in accordance with the teachings herein (BP 5504) allows the primer to achieve 100% cohesive failure when bonded to commercially available sealants from a vendor source other than The Dow Chemical Company, when aged 7 days at room temperature, an additional 7 days water immersion (at 23° C.), an additional 7 days at 90° C., and an additional 7 days cataplasma cycling. The Table 1 that follows illustrates the expected results when unmodified commercially available primers (primer 1 and primer 2) from a vendor source other than The Dow Chemical Company are employed.

TABLE 1

Expected Results

| cleaning | primer | adhesive | 7 d. RT | +7 d. H2O | +7 d. 90° C. | +7 d. Cat |
|---|---|---|---|---|---|---|
| BC 3900 | BP 5504 | adhesive 1 | 5 | 5 | 5 | 5 |
| BC 3900 | BP 5504 | adhesive 2 | 5 | 5 | 5 | 5 |
| BC 3900 | BP 5504 | adhesive 3 | 5 | 5 | 5 | 5 |
| BC 3900 | BP 5504 | BS X 1502 | 5 | 4-5a | 5 | 4-5a |
| BC 3900 | BP 5504 | BM 7120 | 5 | 5 | 5 | 5 |
| BC 3900 | BP 5504 | BM 2700 | 5 | 5 | 5 | 5 |
| BC 3900 | primer 1 | BS X 1502 | 1-a | 1-a | 1-a | 1a |
| BC 3900 | primer 1 | BM 7120 | 1-a | 1-a | 3a | 1a |
| BC 3900 | primer 1 | BM 2700 | 1b | 2-a | 3a | 1-2a |
| BC 3900 | primer 1 | adhesive 1 | 5 | 3-4a | 4-5b | 5 |
| BC 3900 | primer 1 | adhesive 2 | 5 | 3-4ab | 5 | 4-5a |
| BC 3900 | primer 1 | adhesive 3 | 5 | 2a | 3b | 3b |
| BC 3900 | primer 2 | BS X 1502 | 2-3a | 2-3a | 1a | 1-a |
| BC 3900 | primer 2 | BM 7120 | 2-3a | 2-3a | 2-a | 1-a |
| BC 3900 | primer 2 | BM 2700 | 2-a | 2-3a | 2-a | 1-a |

The example primer composition is compared with other commercially available adhesive systems (e.g., Betaseal™ 2002 and 2002 LVRP) for performance and is expected to exhibit 100% cohesive failure after 7 days room temperature aging (50% relative humidity), seven additional days subject to water immersion (at 23° C.), an additional 7 days at 90° C., and an additional 7 days cataplasma cycling.

For analysis of performance of the primers herein with pre-applied adhesive systems, chromium steel substrates are provided and are cleaned with Betaclean™ 3350 (available from The Dow Chemical Company), and allowed to flash off for 2 minutes at about 23° C. and about 50% relative humidity. Thereafter, the substrates are primed with Betaprime™ 1707 (available from The Dow Chemical Company). After a thirty minute flash-off time, a pre-applied adhesive is applied over the Betaprime™ 1707 (e.g., an adhesive such as HV3 pre-applied adhesive, available from The Dow Chemical Company). The samples are then aged 10 weeks at 32° C. and about 80% relative humidity. To the pre-applied adhesive, there is then applied the example primer composition, followed by a bead of Betalseal™ 1965 (available from The Dow Chemical Company). Samples are prepared and subjected to peel testing as described in the following, and also measured for peel strength with a Zwick/Roell ZWART.PRO tensile tester. Samples employing the example primer composition are expected to exhibit 100% cohesive failure after 7 days aging at room temperature. They are also expected to exhibit 100% cohesive failure after 7 additional days aging by cataplasma cycling as described herein. They are expected also to exhibit peel strengths of at least about 19 to about 23 N/cm after 7 days aging at room temperature. They are also expected to exhibit peel strengths of at least about 16 to about 21 N/cm after 7 additional days aging by cataplasma cycling as described herein. By way of comparison, an unmodified commercially available primer (Betaprime™ 5404) is substituted for the example primer composition. It is expected to exhibit peel strengths after 7 days room temperature aging from about 15 to about 23 N/cm, and about 11 to about 19 after 7 additional days aging by cataplasma cycling as described herein. Further, the unmodified commercially available adhesive is expected to exhibit from about 25 to about 75% cohesive failure after 7 days room temperature aging, and zero % cohesive failure after 7 additional days aging by cataplasma cycling as described herein.

An adhesion peel test is performed, by which a bead of adhesive of about 10 to about 15 mm high and about 100 to about 150 mm long is applied to a primed substrate (specifically a float glass primed with the resulting primer compositions herein using a felt applicator) within about 3 minutes of the application of the primer. The adhesive is smoothed to a height of about 4 to about 6 mm, with a spatula, and is then aged in a climatic chamber for about 7 days at about 23° C. and about 50% relative humidity. The assembly is cured for a specific time under the desired conditions. The bead is thereafter peeled back using a pointed nose pliers, which grip the bead and pull the bead while rotating at an angle of about 90°. The cured bead is then cut with a razor blade through to the primed surface, with cuts at about 1 cm intervals. The failure mode is examined and characterized at the delamination surface. The area of cohesive failure is estimated on the basis of the percent of the total area analyzed. The degree of adhesion is evaluated as adhesive failure and/or cohesive failure. In case of adhesive failure, the cured bead can be separated from the primed surface, while in cohesive failure, separation occurs within the sealant bead as a result of cutting and pulling. In observing the failure mode, it is noted over what portion of the interfacial surface area the failure mode is observed. Primer failure is deemed to have occurred if the primer delaminates from the substrate (e.g., glass) to which it is applied.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. References to an acrylic or (meth)acrylic (or derivative terms such as "acrylate") contemplate meth-acrylics and acrylics (and corresponding derivative terms). Ingredients discussed herein may form part of the resulting composition. However, they also may form part of an additive for the resulting composition. For example, it is possible that the adhesion promoter is a vehicle for delivering an ingredient into an admixture for forming the resulting composition. Unless otherwise stated, references to "adhesive" or "sealant" are interchangeable. Thus, mention of an adhesive of a particular composition also encompasses a sealant of such composition.

Though disclosed herein generally in the context of use in a one step primer composition, the adhesion promoters herein are not so limited. They may also be employed as part of a primer system that includes multiple components, and may be added to any or all of the components. For example, the adhesion promoter might be incorporated into a urethane activator composition, a frit preparation composition, a frit primer composition, a PVC primer, a pinchweld primer, or otherwise, such as one or more products from The Dow Chemical Company that has been sold under the designation U-413, U-555, U-4000, U-401, U-402 or the like.

The teachings herein may be suitably employed in combination with one or both of co-pending Provisional Application No. 60/913,700 (filed Apr. 24, 2007), ("One Component Glass Primer Including Oxazolidine"); or co-pending Provisional Application No. 60/913,706 (filed Apr. 24, 2007), ("Improved Primer Adhesion Promoters, Compositions and Methods"), both incorporated by reference herein.

What is claimed is:

1. A method for bonding a first substrate to a second substrate, comprising the steps of:
   a. applying to one or both of the substrates a primer composition that includes i, ii, iii, and iv as defined below
      i. an adhesion promoter, which is an adduct prepared by the reaction of at least one aromatic polyisocyanate compound, with an active hydrogen containing moiety of an organofunctional silane;
      ii. a prepolymer derived from the reaction of at least one aliphatic polyisocyanate and a polyol, and is at least partially reacted with an active hydrogen containing moiety of an organofunctional silane;
      iii. optionally, a solvent;
      iv. an isocyanate functional prepolymer with an isocyanate content greater than about 1%, and being the reaction product of a polyol and an aromatic polyisocyanate wherein the polyol has a functionality of greater than about 2 and a molecular weight ($M_n$) greater than about 300; and
   b. applying an adhesive to at least one of the substrates; and
   c. assembling the two substrates.

2. The method of claim 1, wherein the at least one aromatic polyisocyanate compound includes a thiophosphate, a phosphate, a thiophosphane moiety or any combination thereof.

3. The method of claim 1, wherein i) the at least one aromatic polyisocyanate compound is trifunctional, ii) the at least one aromatic polyisocyanate compound includes tris(isocyanatophenyl)thiophosphate, or both i) and ii).

4. The method of claim 1, wherein the organofunctional silane of the adhesion promoter includes two or three methoxy groups, ethoxy groups, or a combination of both groups bound to each of at least one silicon atom.

5. The method of claim 4, wherein the organofunctional silane of the adhesion promoter is a mercapto silane, an amino silane, or a combination thereof, and wherein about 1 mole of the polyisocyanate is reacted with about 1 to about 3 moles amino-silane, mercapto-silane, or a combination thereof, provided that the molar ratio of hydrogen active groups to isocyanate groups is less than 1.0.

6. The method of claim 1, wherein the primer composition further includes diethylmalonate.

7. The method of claim 6, wherein the primer composition further includes a phosphoric acid, a film forming resin, or both.

8. The method of claim 7, wherein i) the adduct is present in an amount of about 0.5 to about 20% by weight; ii) the prepolymer derived from the reaction of at least one aliphatic polyisocyanate and a polyol is present in an amount of about 10 to about 50% by weight; iii) the aromatic polyisocyanate functional prepolymer with an isocyanate content greater than about 1% is present in an amount of about 20 to about 70% by weight; the solvent is present in an amount of about 40 to about 80% by wt.; iv) diethylmalonate is present in an amount of about 0.1 to about 0.5% by weight; and v) acid is present in an amount of about 0.01 to about 0.05% by weight.

9. The method of claim 8, wherein the primer composition includes at least one film former, a pigment, a catalyst, or a combination thereof.

10. The method of claim 1 wherein about 1 mole of the polyisocyanate is reacted with about 1 to about 3 moles amino-silane, mercapto-silane, or a combination thereof to prepare the adhesion promoter.

11. The method of claim 1 wherein the adhesion promoter is present in a weight ratio of about 1:100 to about 2:1 parts adhesion promoter to aliphatic isocyanate prepolymer.

12. The method of claim 1 wherein the prepolymer derived from the reaction of at least one aliphatic polyisocyanate and a polyol has a free isocyanate content.

13. An assembly comprising:
   a. a first substrate and a second substrate;
   b. a primer composition that is applied to one or both of the first and second substrates, the primer composition as used in claim 1;
   c. an adhesive that is applied to at least one of the substrates for adhering the substrates.

14. The assembly of claim 13, wherein the first and second substrates are selected from glass, enamel, cured polyurethane, glass encapsulation materials, e-coat, galvanic zinc coats, aluminum, steels, paint, plastics, hard coated organic glazing, or any combination thereof.

15. A method for bonding a first substrate to a second substrate, comprising the steps of:
   a. applying to one or both of the substrates a primer composition that includes i, ii, iii, and iv as defined below
      i. an adhesion promoter, which is an adduct prepared by the reaction of at least one aromatic polyisocyanate compound, with an active hydrogen containing moiety of an organofunctional silane, wherein about 1 mole of the polyisocyanate is reacted with about 2.3 to about 3 moles amino-silane, mercapto-silane, or a combination thereof to prepare the adhesion promoter;
      ii. a prepolymer derived from the reaction of at least one aliphatic polyisocyanate and a polyol, and is at least partially reacted with an active hydrogen containing moiety of an organofunctional silane;
      iii. optionally, a solvent;
      iv. an isocyanate functional prepolymer with an isocyanate content greater than about 1%, and being the reaction product of a polyol and an aromatic polyisocyanate; and
   b. applying an adhesive to at least one of the substrates and
   c. assembling the two substrates.

16. The method of claim 15 wherein about 1 mole of the polyisocyanate is reacted with about 2.3 moles amino-silane, mercapto-silane, or a combination thereof to prepare the adhesion promoter.

17. A method for bonding a first substrate to a second substrate, comprising the steps of:
   a. applying to one or both of the substrates a primer composition that includes i, ii, iii, and iv as defined below
      i. an adhesion promoter, which is an adduct prepared by the reaction of at least one aromatic polyisocyanate compound, with an active hydrogen containing moiety of an organofunctional silane—wherein the adhesion promoter is present in an amount of about 2 to about 7 percent by weight;
      ii. a prepolymer derived from the reaction of at least one aliphatic polyisocyanate and a polyol, which is at least partially reacted with an active hydrogen containing moiety of an organofunctional silane, wherein the prepolymer is present in an amount of about 50 to about 65 percent by weight;
      iii. optionally, a solvent;
      iv. an isocyanate functional prepolymer with an isocyanate content greater than about 1 percent, and being the reaction product of a polyol and an aromatic polyisocyanate, wherein the isocyanate functional prepolymer is present in an amount of about 30 to about 40 percent by weight;
      v. a stabilizer present in an amount of about 0.1 to about 0.5 percent by weight; and
      vi. an acid present in an amount of about 0.01 to about 0.05 percent by weight; based on the weight of the composition;
   b. applying an adhesive to at least one of the substrates and
   c. assembling the two substrates.

18. The method of claim 17 wherein the adhesion promoter is present in an amount of about 4 to about 6 percent by weight;
the prepolymer derived from the reaction of at least one aliphatic polyisocyanate and a polyol is present in an amount of about 55 to about 60 percent by weight;
the isocyanate functional prepolymer with an isocyanate content greater than about 1 percent is present in an amount of about 33 to about 38 percent by weight;
the stabilizer is present in an amount of about 0.1 to about 0.5 percent by weight; and
the acid is present in an amount of about 0.01 to about 0.05 percent by weight;
based on the weight of the composition.

* * * * *